D. LOWE.
TIRE TUBE MAKING APPARATUS.
APPLICATION FILED DEC. 10, 1918.
1,337,930.
Patented Apr. 20, 1920.
2 SHEETS—SHEET 1.
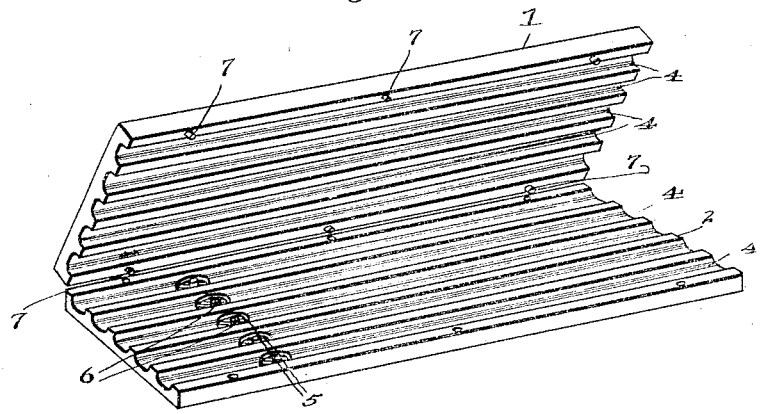
Fig. 1
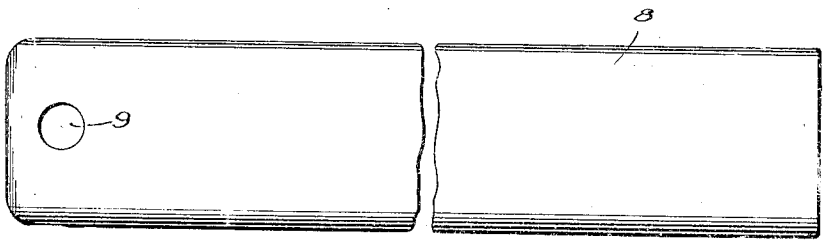 
Fig. 6  Fig. 7
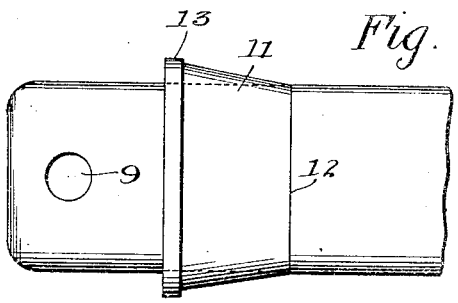 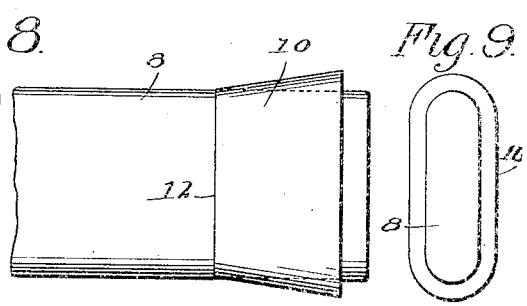
Fig. 8  Fig. 9
Witnesses
R. A. Thomas
Inventor
Dempsey Lowe
By Victor J. Evans
Attorney

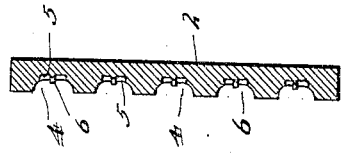
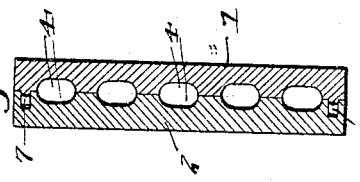
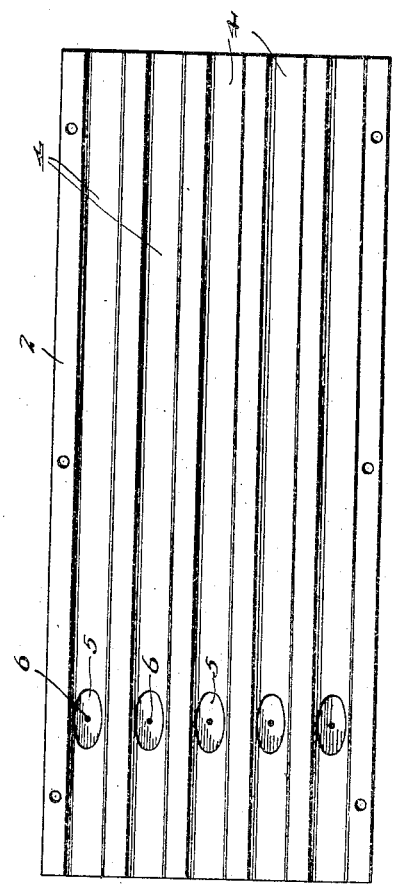
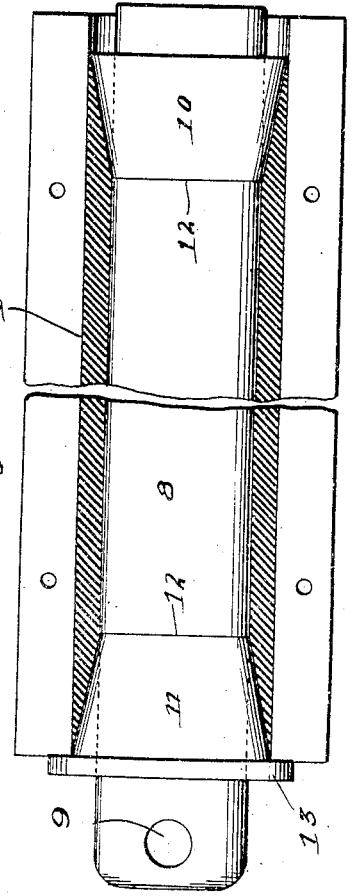
Inventor
Dempsey Lowe

UNITED STATES PATENT OFFICE.

DEMPSEY LOWE, OF AKRON, OHIO.

TIRE-TUBE-MAKING APPARATUS.

1,337,930.  Specification of Letters Patent.  Patented Apr. 20, 1920.

Application filed December 10, 1918. Serial No. 266,168.

*To all whom it may concern:*

Be it known that I, DEMPSEY LOWE, a citizen of the United States, residing at Akron, in the county of Summit and State of Ohio, have invented new and useful Improvements in Tire-Tube-Making Apparatus, of which the following is a specification.

This invention relates to an apparatus for manufacturing tire tubes and especially tubes designed for use in connection with the outer cases of pneumatic tires, said tubes being inflatable and provided with an inflating valve tube or casing. The tube also comprises a reinforcement surrounding the base of the tire inflating valve casing.

A further object of the invention is to provide apparatus to insure the accurate formation of inflatable tire tubes of an exact predetermined length, having an integral reinforcement and also formed during the manufacture thereof with the necessary hole through the center of said reinforcement to receive the valve casing.

With the above and other objects in view the invention consists in the novel construction, combination and arrangement of parts, herein fully described, illustrated and claimed, also in the method of manufacturing such tire tubes.

In the accompanying drawings:—

Figure 1 is a perspective view of the mold, the same being shown as adapted to simultaneously form a plurality of tubes.

Fig. 2 is an enlarged plan view of one of the mold sections.

Fig. 3 is a cross sectional view through the same.

Fig. 4 is a cross section through the complete mold.

Fig. 5 is an enlarged longitudinal section through one of the mold channels showing the manner of forming a tube therein.

Fig. 6 is a plan view of one of the mandrels.

Fig. 7 is an end view of the same.

Fig. 8 is a plan view of one of the mandrels showing the skived end forming members thereon.

Fig. 9 is an end view of the same.

In the preferred embodiment of this invention, I employ a sectional mold as shown in Fig. 1, said mold comprising sections 1 and 2 which are adapted to be opened and closed with relation to each other to admit the mandrels hereinafter referred to and to permit said mandrels to be removed after the tube thereon has been cured.

Each mold section 1 and 2 has a series of tube shaping channels 4, said channels being arranged in spaced and parallel relation to each other and extending throughout the entire length of the respective mold sections. Each of the channels 4 of one of the mold sections is formed with a depression 5 at a suitable point in the length thereof, said depressions serving to receive and shape what is known as the reinforcement which surrounds the space occupied by the casing of the inflating valve used in conjunction with the completed tube. In the center of each depression 5 is an upstanding stud 6 designed to form the hole in the tube, which hole is adapted to receive the casing of the inflating valve. The reinforcement and the tire valve receiving hole are thus formed simultaneously with the formation and curing of the complete tube. When the sections of the mold are brought into contact with each other, they are held fixedly in relation to each other by means of guide pins 7 projecting from one of the mold sections and entering sockets or holes in the other mold section as shown in Fig. 4.

The channels 4 of the opposing sections of the mold are arranged in opposed and mating relation to each other and in each of such pair of channels is arranged a mandrel 8 of any suitable shape in cross section corresponding with the cross sectional shape of the opposing channels of the mold in which the mandrel is placed. Each mandrel 8 may be of any suitable length and made of any suitable material and is formed in one end thereof with a hole 9 to receive a suitable implement for withdrawing the mandrel and finished tube thereon from the mold.

In connection with each mandrel 8 I employ a pair of skived end forming members 10 and 11. The members 10 and 11 are adapted to be slipped over the ends of the mandrel as shown in Fig. 8 and each of said members 10 and 11 has a feather edge 12 lying practically flush with the outer surface of the mandrel. One of the members 11 is formed with an end flange 13 which serves to limit the inward movement of the member 11 so that the adjacent extremity of the tube will bear a fixed relation to or distance from the respective hole forming stud 6 hereinabove referred to. The skiving members 10 and 11 serve to impart chamfered and feather edges to the opposite extremities of the completed tube, enabling such extremities of the tube to be overlapped and cemented or otherwise firmly united together.

In carrying out the method of forming an inner tube for pneumatic tires, the stock is first wrapped or otherwise placed around the mandrel 8 after the end skiving members 10 and 11 have been properly positioned upon said mandrel. As soon as the necessary amount of stock has been placed upon the mandrel, the mandrel is placed in the mold and the sections of the mold are closed upon each other. In wrapping the stock upon the mandrel a suitable piece of material is interposed between the layers of the stock for the purpose of forming a reinforcement or what is known as the friction member of the tube, said reinforcement being pressed into the respective depression 5 hereinabove described. When the parts have been combined in the manner just set forth, the mold is placed in a suitable curing press and the tube is cured for the proper period of time under proper degree of heat. The mandrel is then removed from the mold and the end skiving members, one or both, are then removed from the mandrel, permitting the completed tube to be withdrawn from the mandrel.

What I claim is:—

1. In tire tube making apparatus, a curing mold embodying oppositely arranged separable mold sections having tube receiving channels in opposed and mating relation to each other, and a stock holding and shaping mandrel removably mounted therein and carrying detachable end skiving members contacting with the walls of the mold.

2. In tire tube making apparatus, a curing mold embodying oppositely arranged separable mold sections having tube receiving channels in opposed and mating relation to each other, and a stock holding and shaping mandrel removably mounted therein and carrying detachable end skiving members, one of which has a stock flange for positioning the adjacent extremity of the completed tube in relation to the valve hole thereof.

3. In a tire tube making apparatus, a curing mold embodying oppositely arranged separable mold sections having tube receiving channels in opposed and mating relation to each other, a stock holding and shaping mandrel removably mounted therein and combined means carried by the mandrel for tapering the ends of the tubes and spacing the mandrel from the walls of the mold.

In testimony whereof I affix my signature.

DEMPSEY LOWE.